(12) United States Patent
Filsfils et al.

(10) Patent No.: US 11,418,435 B2
(45) Date of Patent: Aug. 16, 2022

(54) INBAND GROUP-BASED NETWORK POLICY USING SRV6

(71) Applicant: Cisco Technology, Inc., San Jose, CA (US)

(72) Inventors: Clarence Filsfils, Brussels (BE); Ahmed Mohamed Ahmed Abdelsalam, L'Aquila (IT); Francois Clad, Strasbourg (FR); Pablo Camarillo Garvia, Madrid (ES); Kiran Sasidharan Pillai, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 14 days.

(21) Appl. No.: 16/860,896

(22) Filed: Apr. 28, 2020

(65) Prior Publication Data
US 2021/0243116 A1 Aug. 5, 2021

Related U.S. Application Data

(60) Provisional application No. 62/968,418, filed on Jan. 31, 2020.

(51) Int. Cl.
| | | |
|---|---|---|
| *H04L 45/50* | (2022.01) | |
| *H04L 12/46* | (2006.01) | |
| *H04L 45/74* | (2022.01) | |
| *H04L 45/28* | (2022.01) | |
| *H04L 69/22* | (2022.01) | |

(52) U.S. Cl.
CPC .......... *H04L 45/50* (2013.01); *H04L 12/4633* (2013.01); *H04L 45/28* (2013.01); *H04L 45/74* (2013.01); *H04L 69/22* (2013.01)

(58) Field of Classification Search
CPC ......... H04L 45/00; H04L 45/16; H04L 45/24; H04L 45/38; H04L 45/54; H04L 45/74; H04L 45/741; H04L 45/745; H04L 63/02; H04L 63/0227; H04L 63/0263; H04L 63/104; H04L 41/0893; H04L 12/4633; H04L 47/20; H04L 47/2441
See application file for complete search history.

(56) References Cited

U.S. PATENT DOCUMENTS

2004/0268124 A1  12/2004  Narayanan
2015/0124809 A1*  5/2015  Edsall ................ H04L 41/0893
                                                370/390

(Continued)

*Primary Examiner* — Peter Chen
(74) *Attorney, Agent, or Firm* — Polsinelli PC

(57) ABSTRACT

The present technology pertains to a group-based network policy using Segment Routing over an IPv6 dataplane (SRv6). After a source application sends a packet, an ingress node can receive the packet, and if the source node is capable, it can identify an application policy and apply it. The ingress node indicates that the policy has been applied by including policy bits in the packet encapsulation. When the packet is received by the egress node, it can determine whether the policy was already applied, and if so, the packet is forward to the destination application. If the egress node determines that the policy has not be applied the destination application can apply the policy. Both the ingress node and egress nodes can learn of source application groups, destination application groups, and applicable policies through communication with aspects of the segment routing fabric.

20 Claims, 5 Drawing Sheets

(56) References Cited

U.S. PATENT DOCUMENTS

| | | | |
|---|---|---|---|
| 2016/0080285 A1* | 3/2016 | Ramachandran | H04L 67/327 |
| | | | 709/223 |
| 2017/0250869 A1* | 8/2017 | Voellmy | H04L 43/14 |
| 2018/0295036 A1 | 10/2018 | Krishnamurthy et al. | |
| 2019/0089680 A1 | 3/2019 | Magganmane et al. | |
| 2019/0394211 A1 | 3/2019 | Filsfils et al. | |
| 2021/0243107 A1* | 8/2021 | Retana | H04L 45/42 |

* cited by examiner

INBAND GROUP-BASED NETWORK POLICY USING SRV6

CROSS-REFERENCE TO RELATED APPLICATIONS

This application claims priority to U.S. Provisional Patent Application No. 62/968,418, filed on Jan. 31, 2020, entitled "INBAND GROUP-BASED POLICY USING SRV6," the content of which is incorporated herein by reference in its entirety.

TECHNICAL FIELD

The present technology pertains to distributed computing architectures, and more specifically pertains to the network policy implementation in distributed computing architectures using Segment Routing over IPv6 dataplane (SRv6).

BACKGROUND

Cloud and distributed computing services are used to run diverse workloads for multiple clients and applications. In some cases, the applications are designed as a multi-tier structure with separate tiers for front-end, logic, and database. Cloud and distributed computing services may also provide multiple microservices. Example microservices include payment and recommendation services for each application. Micro services or application tiers can be deployed as virtual machines (VMs) or containers. The multiple micro services and tiers of an application may send packets to each other according to a set of rules defined by the network policy. Current methods of enforcing the network policy use an access control list (ACL) or a policy-based routing (PBR) that uses the IP addresses of the virtual machines (VMs) or containers. However, given the complex structure and the short life span of these VM/container IP addresses in the virtual application, such methods that are heavily tied into the VMs/containers and such implementations of network policies are inefficient.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
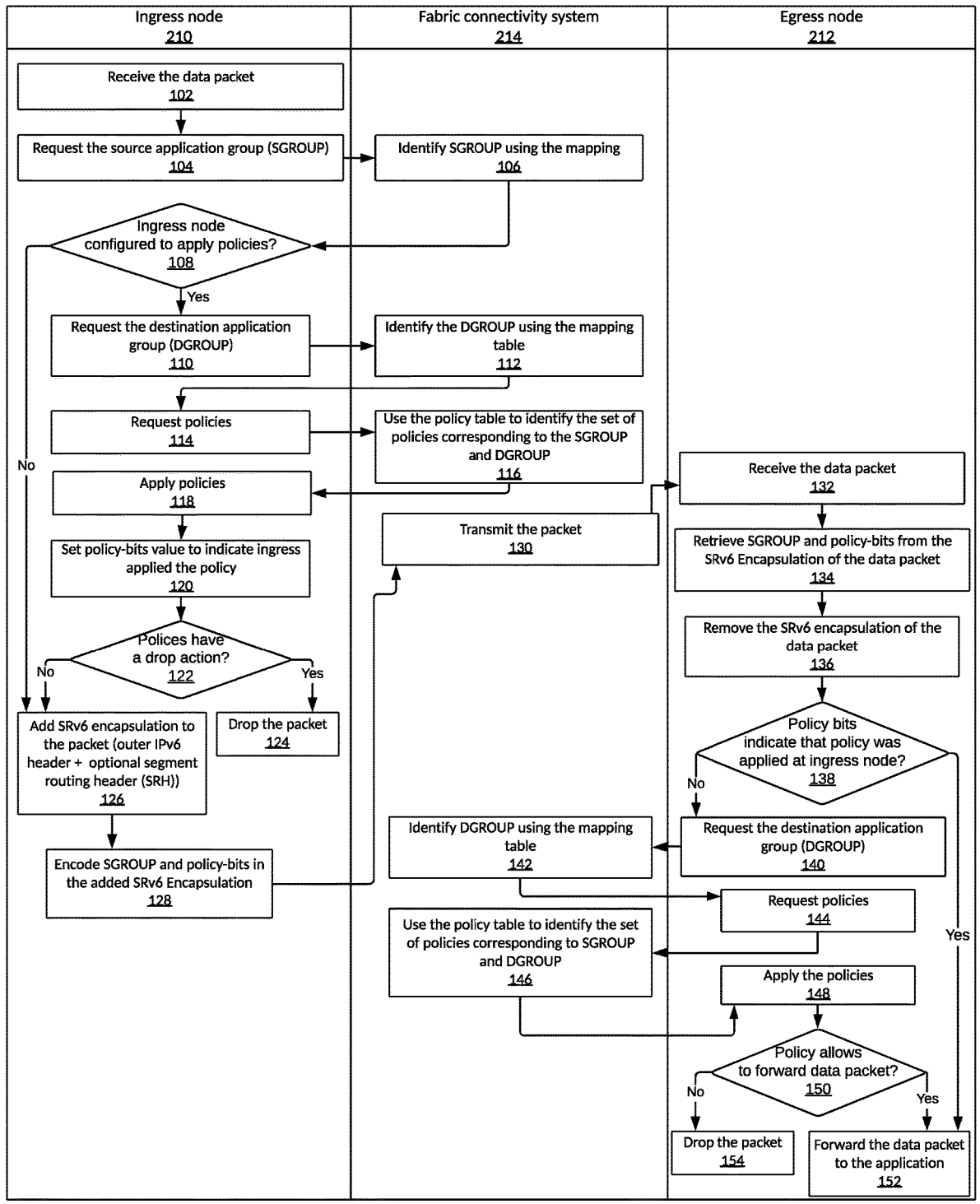
FIG. 1 an example method embodiment used by an inband group based network policy system to transmit a data packet in accordance with some aspects of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

This present technology pertains to a group-based security policy using Segment Routing over IPv6 dataplane (SRv6). When a source application, sends a packet, the corresponding ingress node, which can be a virtual switch, top of rack (ToR) switch, smart network interface card (smartNIC) or provider edge (PE) router, identifies the source application group according to a mapping table. If the ingress node is configured to apply the network policies, it identifies the set of policies corresponding source application group and destination application group. The source application and destination application group are identified using the mapping table of the fabric connectivity system. The ingress node applies the set of policies to the data packet and sets the policy-bits value to indicate that the policies have been applied at ingress node. The applied polices can have an associated action to drop the packet, hence the packet may be dropped accordingly. If packets were not dropped by any of the applied policies or the ingress node was not configured to apply the network policy, the ingress node encapsulates the data packet with SRv6 encapsulation (an outer IPv6 header and an optional segment routing header). The segment routing header contains a list of one more segment identifiers (SIDs) that define the path of the packet through the fabric such that the last SID is an identifier of the egress node connected to the destination application. Each SID is composed of three parts known as location, function and arguments. The location identifies the router in the fabric to process the packet, the function identifies which type of processing to be applied to the packet, and the arguments represents some optional parameters encoded by the source and taken in consideration when the router executes the behavior identified by the function part. The ingress node encodes both the source application group and the policy-bits as part of the source address of the outer IPv6 header, or the arguments part of the SID that identifies the egress node, or in the tag field of the segment routing header of the SRv6 encapsulation. Ingress and egress nodes of a given network agree on the location to encode the source application group and the policy-bits in the SRv6 encapsulation. Once encapsulated, the packet is forwarded to the egress node, which can be a virtual switch, ToR switch, smartNIC or PE router. Once the egress node receives the packet, it retrieves the source application group and the policy bits from the data packet encapsulation, removes the SRv6 encapsulation, and then checks the policy-bits to identify if the network policies were applied at ingress node; if so, the packet is forwarded to the destination application; if not, the egress identifies the destination application group according to the mapping table of the fabric connectivity system, then identifies, using the policy table of the fabric connectivity system, the set of policies corresponding source application group and destination application group pair. The egress node applies the policies and forward the packet to the destination application, if the policies allow. Otherwise, the packets are dropped. The network policy can be of any form and not limited to just forward or drop packets to the destination application.

Example Embodiments

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The disclosed technology addresses the need in the art for a scalable network policy implementation in cloud and distributive computing architectures.

Figure 2:
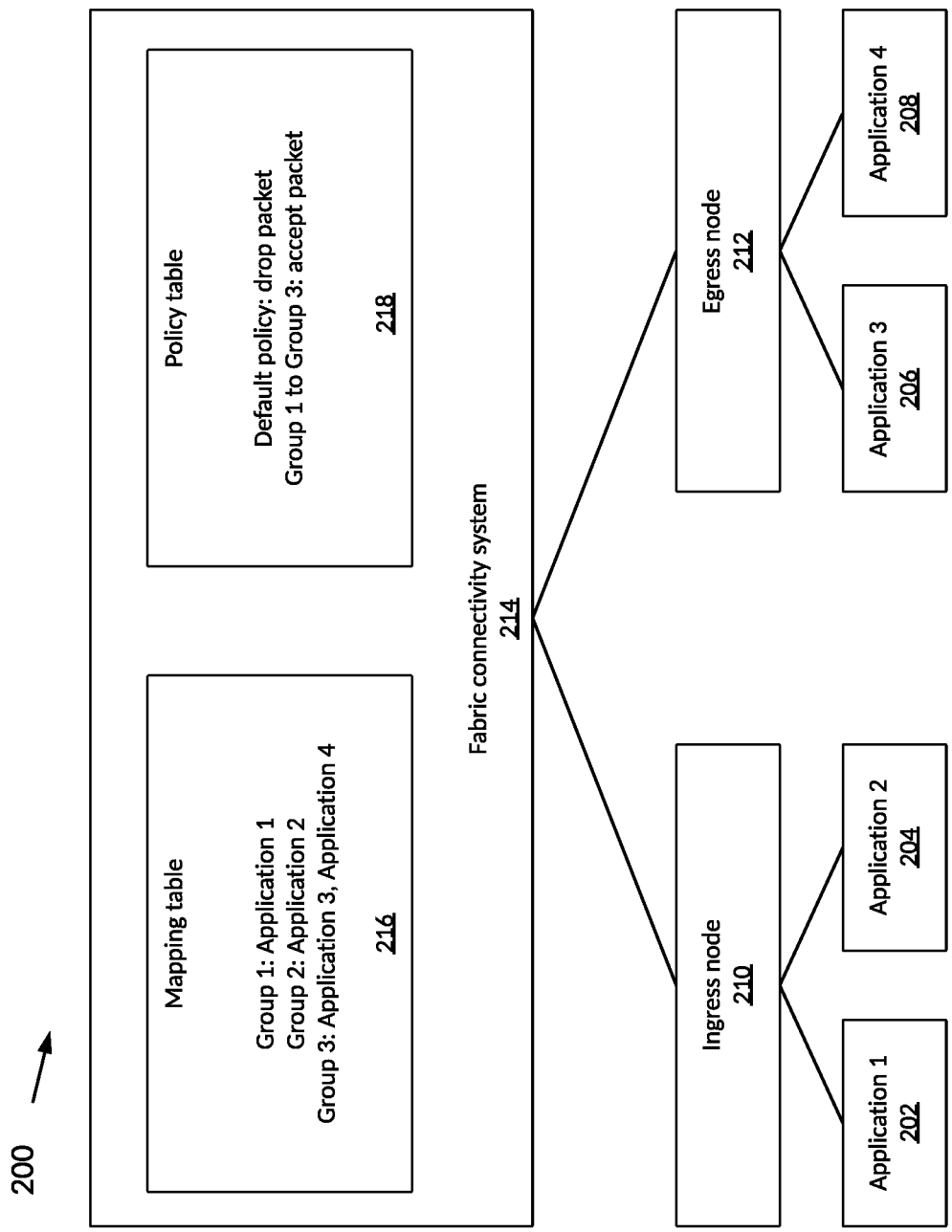
FIG. 2 illustrates an example system embodiment on which the inband group based network policy system may be implemented in accordance with some aspects of the present technology.

As shown in FIG. 1 and FIG. 2, the inband group based policy system 200 comprises an ingress node 210, a fabric connectivity system 214, and a egress node 212. The ingress node 210 is connected to the source application, and the egress node 212 is connected to the destination application. The fabric connectivity system 214 can be a segment routing fabric for performing segment routing.

When the source application sends a data packet to the destination application, the ingress node 210 receives (102) the data packet from an application and identifies a source application group for the source application by requesting (104) the source application group from the fabric connectivity system 214. The fabric connectivity system 214 refers to the mapping table 216 to identify (106) the source application group (SGROUP), and returns this value to the ingress node 210.

The mapping table 216 includes rules that maps applications to groups. For example, in FIG. 2 the mapping table 216 comprises rules that map Application 1 202 to Group 1, Application 2 204 to Group 2, and Application 3 206 and Application 4 208 to Group 3.

If the ingress node 210 determines that it is configured to apply the network policy (108), it identifies a destination application group for the destination application by requesting (110) the destination application group (DGROUP) from the fabric connectivity system 214. The fabric connectivity system 214 refers to the mapping table 216 to identify (112) the destination application group (DGROUP), and returns this value to the ingress node 210. Alternatively, if the ingress node 210 is not configured to apply the network policy (108), the ingress node 210 adds (126) SRv6 encapsulation (outer IPv6 header 305+optional segment routing header 315) to the data packet, and encodes (128) the source application group in the added SRv6 encapsulation before transmitting the packet 130 through the fabric connectivity system 214.

The ingress node 210 identifies a set of group-based policies by requesting (114) the set of group-based policies to be applied to the data packet from the fabric connectivity system 214. The fabric connectivity system 214 refers to the policy table 218 to identify (116) the set of policies corresponding to the source and destination application group pair in the policy table 218, and returns this value to the ingress node 210. Then, the ingress node 210 applies (118) the policies and sets policy-bits value (120) to indicate that policies were applied successfully.

If ingress node 210 determines that one of the policies has an action to drop the packet (122), the ingress node 210 drops (124) the packet accordingly.

If the ingress node is not configured to apply the policy (108), or the ingress node 210 determines that the set of policies allows to forward the packet (122), then the ingress node 210 adds (126) SRv6 encapsulation (outer IPv6 header 305+optional segment routing header 315) to the data packet, and encodes (128) the source application group and policy-bits in the added SRv6 encapsulation.

The ingress node 210 encodes (128) the source application group (SGROUP) and the policy-bits in the source address 301 of the outer IPv6 header 305, in the arguments part of the segment identifier that identifies the egress node, or in the tag field of the segment routing header of the SRv6 encapsulation. The segment identifier of the egress node can be encoded as the destination address 302 of the packet, or in the Segment List 318 of the optional segment routing header 315. This data packet, now with the SRv6 encapsulation (outer IPv6 header 305 and the optional segment routing header 315), and with both source application group and the policy-bits encoded in the packet 300, is transmitted (130) to the egress node 212 via the fabric connectivity system 214.

Figure 3:
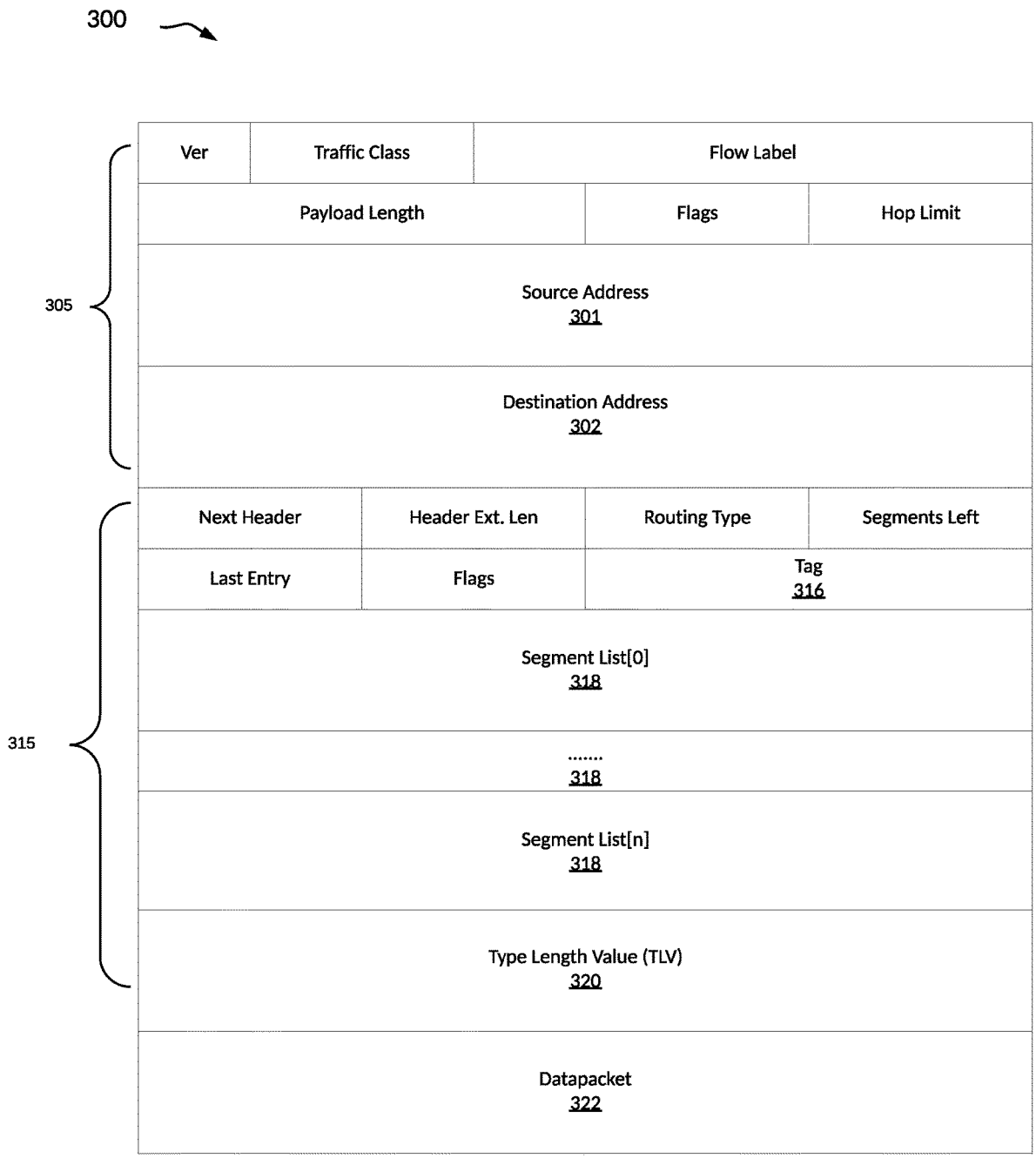
FIG. 3 is an example header format for data packets transmitted in accordance with some aspects of the present technology.

FIG. 3 shows an example header format 300 of the transmitted data packet including an outer IPv6 header 305 and an optional segment routing header 315. The IPv6 header includes a "Version," "Traffic Class," "Flow Label," "Payload Length," "Flags," "Hope Limit," "Source Address" 301, and "Destination Address" 302 fields. The segment routing header comprise a "Next Header," "Header Extension Length," "Routing Type," "Segments Left," "Last Entry," "Flags," and "Tag," 316 "Segment List," 318 fields, and an optional Type-Length-Value (TLV) 320 that carries any information that may be useful for the segment routing process.

When the egress node 212 receives (132) the data packet, it identifies the source application group for the source application by obtaining (134) both the source application group and policy-bits of the data packet. The egress node 212 then removes (136) the SRv6 encapsulation (outer IPv6 header 305 and segment routing header 315) from the data packet.

To determine if the data packet should be transmitted to the destination application, the egress node 212 checks (138) the policy-bits to determine whether the policy was applied at ingress, and if the policy was applied at ingress, the egress node 212 forwards (152) the data packet to the destination application.

If policy was not applied by the ingress (138), the egress node 212 can identify the destination application group by requesting (140) the destination application group from the fabric connectivity system 214. The fabric connectivity system 214 refers to the mapping table 216 to identify (142) the destination application group (DGROUP), and returns this value to the egress node 212. The egress node 212 can identify a set of group-based policies to be applied to the data packet by requesting (144) the corresponding network policy from the fabric connectivity system 214. The fabric connectivity system 214 refers to the policy table 218 to identify (146) the policy with the corresponding source application group (SGROUP) and destination application group (DGROUP). This policy is returned to the egress node 212, and the egress node 212 applies the policy (148). The egress node 212 determines whether the data packet 322 should be (150) transmitted. If the egress node 212 determine that the data packet 322 should be transmitted (150), the egress node 212 forwards (152) the data packet 322 to the destination application. If the data packet should not be transmitted according to the policy, the egress node 212 drops (154) the data packet 322.

In the example system shown in FIG. 2, a data packet transmitted from Application 1, corresponding to Group 1 in the mapping table 216, to Application 4, corresponding to Group 3 in the mapping table 216, would be successfully transmitted as the policy table 218 includes a policy that accept and forward packets from Group 1 to Group 3. However, a data packet transmitted from Application 2, corresponding to Group 2 in the mapping table 216, to Application 3, corresponding to Group 3 in the mapping table 216, would be dropped as the policy table 218 includes a policy that drops packets from Group 2 to Group 3 (e.g. the default policy). While the present description has referred to a simple policy that determines whether a packet should be forwarded or dropped, persons of ordinary skill in the art would appreciate that policies can for other purposes and more complex or nuanced than the example referred to herein. The policies defined in the policy table 218 can be more than policies to accept or drop packets based on source and destination applications.

Figure 4:
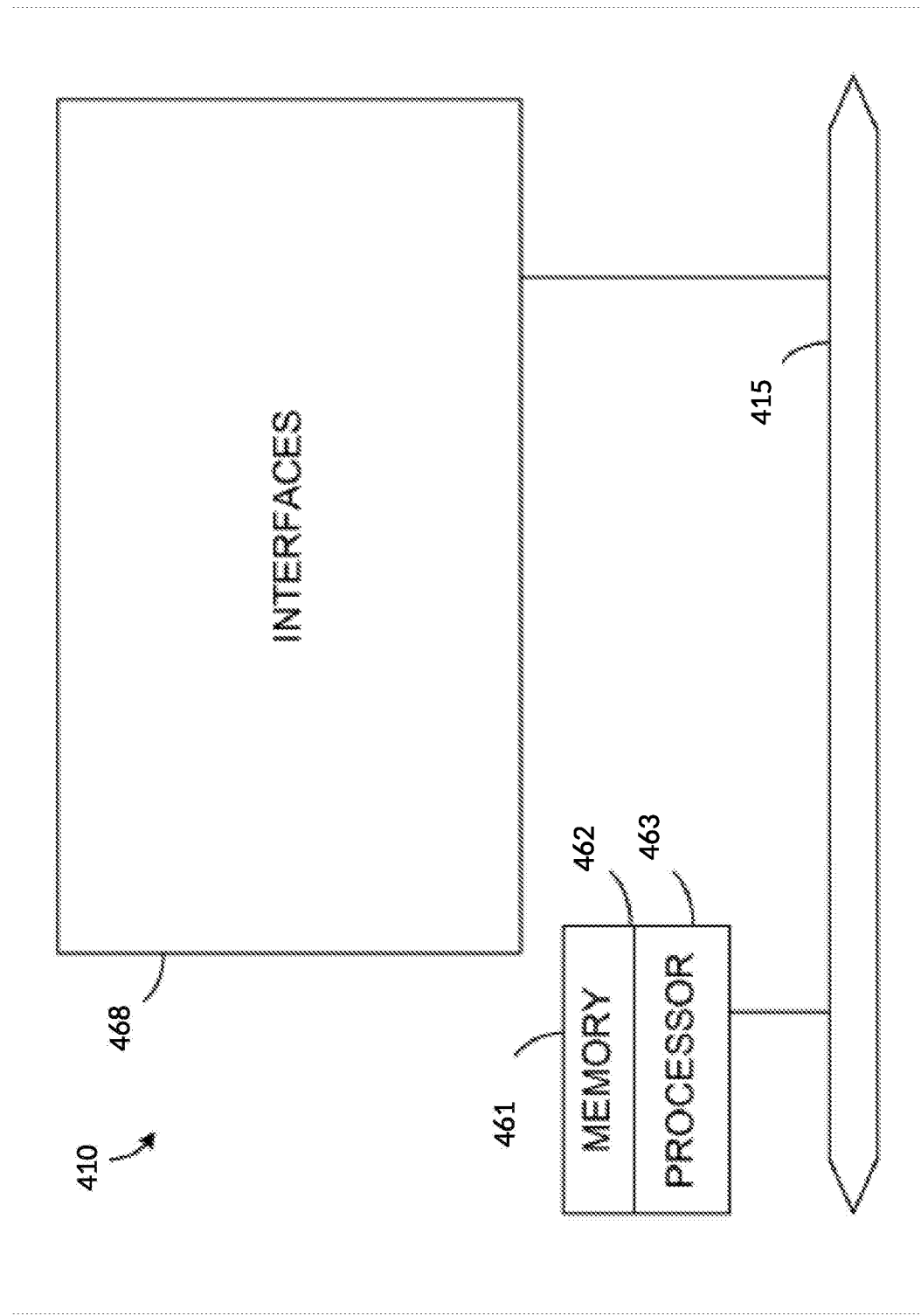
FIG. 4 illustrates an exemplary network device embodiment in accordance with some aspects of the present technology.

FIG. 4 illustrates an exemplary network device 410 suitable for implementing the present technology. Network device 410 includes a master central processing unit (CPU) 462, interfaces 468, and a bus 415 (e.g., a PCI bus). When acting under the control of appropriate software or firmware, the CPU 462 is responsible for controlling the system to execute the process as described above. It preferably accomplishes all these functions under the control of software including an operating system and any appropriate applications software. CPU 462 may include one or more processors 463 such as a processor from the Motorola family of microprocessors or the MIPS family of microprocessors. In an alternative embodiment, processor 463 is specially designed hardware for controlling the operations of router 410. In a specific embodiment, a memory 461 (such as non-volatile RAM and/or ROM) also forms part of CPU 462. However, there are many different ways in which memory could be coupled to the system.

The interfaces 468 are typically provided as interface cards (sometimes referred to as "line cards"). Generally, they control the sending and receiving of data packets over the network and sometimes support other peripherals used with the router 410. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 462 to efficiently perform routing computations, network diagnostics, security functions, etc.

Although the system shown in FIG. 4 is one specific network device of the present technology, it is by no means the only network device architecture on which the present technology can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 461) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Figure 5:
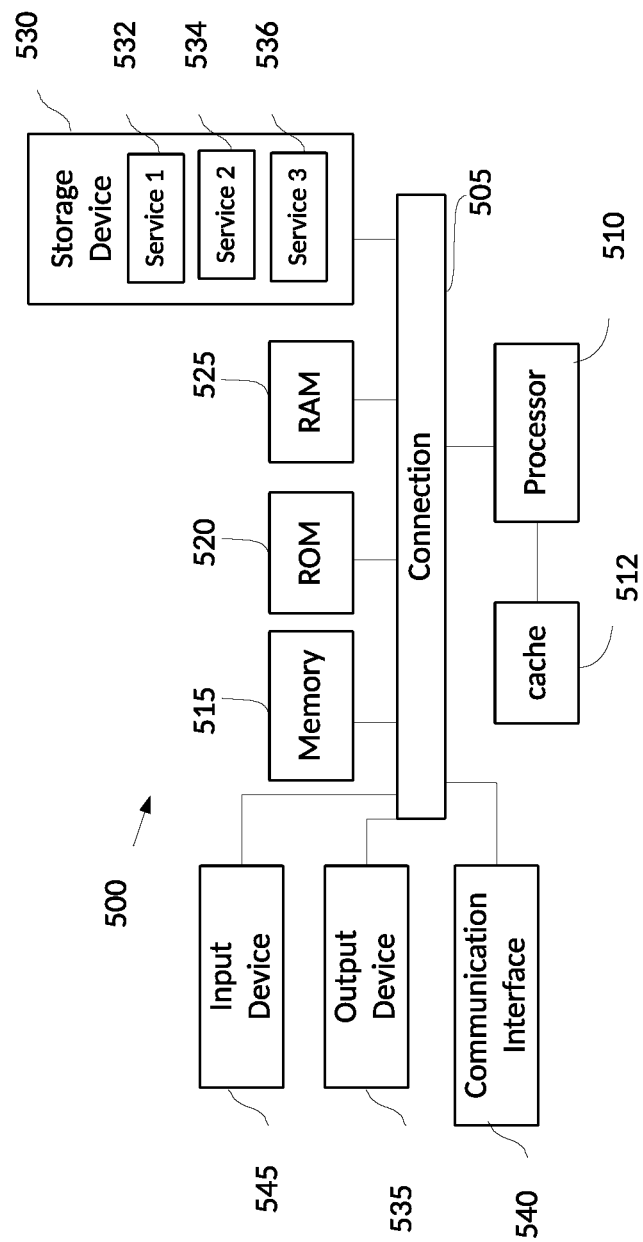
FIG. 5 shows an example computing system embodiment in accordance with some aspects of the present technology.

FIG. 5 shows an example of computing system 500, which can be for example any computing device making up the computing system running ingress node 210 and/or egress node 212 or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments computing system 500 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read only memory (ROM) 520 and random access memory (RAM) 525 to processor 510. Computing system 500 can include a cache of high-speed memory 512 connected directly with, in close proximity to, or integrated as part of processor 510.

Processor 510 can include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
first receiving, at an ingress node, a first data packet;
second receiving, after receiving the first data packet, a source application group for the first data packet;
determining, in response to the second receiving, whether the ingress node is configured to apply network policies;
in response to a determination that the ingress node is configured to apply network policies:
third receiving, by the ingress node, a destination application group for a destination application and a network policy;
applying the network policy;
dropping the first data packet in response to the network policy having a drop action; and
adding a Segment Routing over an IPv6 dataplane (SRv6) encapsulation to the first data packet in response to the network policy lacking a drop action.

2. The method of claim 1, where in the SRv6 encapsulation includes an outer IPv6 header and a segment routing header.

3. The method of claim 1, further comprising:
adding a SRv6 encapsulation to the first data packet in response to a determination that the ingress node is not configured to apply network policies.

4. The method of claim 3, where in the SRv6 encapsulation includes an outer IPv6 header and a segment routing header.

5. The method of claim 1, further comprising:
requesting, between the first and second receiving, the source application group for the first data packet from a fabric connectivity system; and
the second receiving comprising receiving a reply from the fabric connectivity system.

6. The method of claim 1, further comprising:
encoding the source application group into the SRv6 encapsulation; and
transmitting, after the encoding, the first data packet to a fabric connectivity system.

7. The method of claim 3, further comprising:
encoding the source application group into the SRv6 encapsulation; and
transmitting, after the encoding, the first data packet to a fabric connectivity system.

8. A non-transitory computer readable medium storing instructions which are programmed to cause a system including electronic computer hardware in combination with software to perform operations comprising:
- first receiving, at an ingress node, a first data packet;
- second receiving, after receiving the first data packet, a source application group for the first data packet;
- determining, in response to the second receiving, whether the ingress node is configured to apply network policies;
- in response to a determination that the ingress node is configured to apply network policies:
  - third receiving, by the ingress node, a destination application group for a destination application and a network policy;
  - applying the network policy;
- dropping the first data packet in response to the network policy having a drop action; and
- adding a Segment Routing over an Ipv6 dataplane (SRv6) encapsulation to the first data packet in response to the network policy lacking a drop action.

9. The non-transitory computer readable medium of claim 8, where in the SRv6 encapsulation includes an outer IPv6 header and a segment routing header.

10. The non-transitory computer readable medium of claim 8, the operations further comprising:
- adding a SRv6 encapsulation to the first data packet in response to a determination that the ingress node is not configured to apply network policies.

11. The non-transitory computer readable medium of claim 10, where in the SRv6 encapsulation includes an outer IPv6 header and a segment routing header.

12. The non-transitory computer readable medium of claim 8, the operations further comprising:
- requesting, between the first and second receiving, the source application group for the first data packet from a fabric connectivity system; and
- the second receiving comprising receiving a reply from the fabric connectivity system.

13. The non-transitory computer readable medium of claim 8, the operations further comprising:
- encoding the source application group into the SRv6 encapsulation; and
- transmitting, after the encoding, the first data packet to a fabric connectivity system.

14. The non-transitory computer readable medium of claim 10, the operations further comprising:
- encoding the source application group into the SRv6 encapsulation; and
- transmitting, after the encoding, the first data packet to a fabric connectivity system.

15. A system, comprising:
- a processor;
- a non-transitory computer readable medium storing instructions which are programmed to cause the processor to perform operations comprising:
  - first receiving, at an ingress node, a first data packet;
  - second receiving, after receiving the first data packet, a source application group for the first data packet;
  - determining, in response to the second receiving, whether the ingress node is configured to apply network policies;
  - in response to a determination that the ingress node is configured to apply network policies:
    - third receiving, by the ingress node, a destination application group for a destination application and a network policy;
    - applying the network policy;
  - dropping the first data packet in response to the network policy having a drop action; and
  - adding a Segment Routing over an IPv6 dataplane (SRv6) encapsulation to the first data packet in response to the network policy lacking a drop action.

16. The system of claim 15, where in the SRv6 encapsulation includes an outer IPv6 header and a segment routing header.

17. The system of claim 15, the operations further comprising:
- adding a SRv6 encapsulation to the first data packet in response to a determination that the ingress node is not configured to apply network policies.

18. The system of claim 17, where in the SRv6 encapsulation includes an outer IPv6 header and a segment routing header.

19. The system of claim 15, the operations further comprising:
- requesting, between the first and second receiving, the source application group for the first data packet from a fabric connectivity system; and
- the second receiving comprising receiving a reply from the fabric connectivity system.

20. The system of claim 15, the operations further comprising:
- encoding the source application group into the SRv6 encapsulation; and
- transmitting, after the encoding, the first data packet to a fabric connectivity system.

* * * * *